United States Patent
Staver et al.

(10) Patent No.: US 10,371,873 B2
(45) Date of Patent: Aug. 6, 2019

(54) HIGH FIDELITY OPTICAL BEAM DUMP

(71) Applicant: BAE SYSTEMS Information and Electronic Systems Integration Inc., Nashua, NH (US)

(72) Inventors: Philip R Staver, Wilton, NH (US); Adam J Marcinuk, Lyndeborough, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 299 days.

(21) Appl. No.: 15/371,972

(22) Filed: Dec. 7, 2016

(65) Prior Publication Data

US 2018/0156947 A1    Jun. 7, 2018

(51) Int. Cl.
*G02B 27/00* (2006.01)
*G02B 5/00* (2006.01)

(52) U.S. Cl.
CPC .................... *G02B 5/003* (2013.01)

(58) Field of Classification Search
CPC .... B23K 26/705; G01J 1/0418; G01J 1/4257; G02B 5/003; G02B 27/00
See application file for complete search history.

(56) References Cited

U.S. PATENT DOCUMENTS

| | | | | |
|---|---|---|---|---|
| 6,024,458 A * | 2/2000 | Lundgren | ................ | G02B 7/00 359/399 |
| 7,854,523 B2 * | 12/2010 | Nestorovic | ........ | G02B 27/0101 359/601 |
| 8,071,911 B2 * | 12/2011 | Garry | ................... | B23K 15/085 219/121.71 |
| 8,237,922 B2 * | 8/2012 | Scaggs | ....................... | G01J 1/04 356/121 |
| 8,619,247 B1 * | 12/2013 | Scaggs | ................. | G01J 1/4257 356/121 |
| 8,998,430 B2 * | 4/2015 | Luecke | ................... | G02B 5/003 250/461.1 |
| 2003/0210465 A1 * | 11/2003 | Valenti | ................... | G02B 5/003 359/614 |
| 2011/0011449 A1 * | 1/2011 | Morgan | .................. | H01L 29/70 136/255 |
| 2011/0249256 A1 * | 10/2011 | Scaggs | ....................... | G01J 1/04 356/121 |
| 2013/0264470 A1 * | 10/2013 | Nishiwaki | ............ | G02B 6/0036 250/216 |
| 2013/0299684 A1 * | 11/2013 | Nishiwaki | ................ | G02B 6/34 250/227.11 |
| 2013/0299685 A1 * | 11/2013 | Nishiwaki | ............. | G01J 1/0407 250/237 G |
| 2013/0306844 A1 * | 11/2013 | Nishiwaki | ............. | G01J 1/0407 250/216 |

(Continued)

*Primary Examiner* — William R Alexander
*Assistant Examiner* — Balram T Parbadia
(74) *Attorney, Agent, or Firm* — Maine Cernota & Rardin

(57) ABSTRACT

A high efficiency optical beam dump having at least two glass plates configured to define an optical path configured to reflect a beam incident the optical path from plate to plate, wherein the plates include anti-reflective coatings and high reflective coatings and wherein the high-efficiency optical beam dump is capable of very high levels of attenuation through repetitive absorption and reflection of an optical beam.

18 Claims, 12 Drawing Sheets

(56) References Cited

U.S. PATENT DOCUMENTS

2016/0062121 A1* 3/2016 Border ............... G02B 27/0172
  359/630
2016/0091420 A1* 3/2016 Koulikov ............. G01N 21/39
  356/437

* cited by examiner

HIGH FIDELITY OPTICAL BEAM DUMP

STATEMENT OF GOVERNMENT INTEREST

The invention was made with United States Government support under Contract No. FA8650-14-C-7427 awarded by US DEPARTMENT OF THE AIR FORCE. The United States Government has certain rights in this invention.

FIELD

The disclosure relates to optical systems, and more particularly, to an optical isolator for the isolation of optical sensors and other devices from, or attenuation of, energy in the form of light.

BACKGROUND

Certain existing optical devices employ laser systems to illuminate targets that are then observed with a receiver sensor. Frequently, these receivers are located in the same device and transportation platform (e.g. an airplane, truck, or other vehicle) in which the transmitting laser is located.

For very demanding applications, the receiver sensors may employ very sensitive detectors that are often highly susceptible to disruption by stray light. This stray light, when it illuminates the detector in the receiver, may render the detector useless for its intended application due to at least one of two distinct phenomena. The first phenomenon occurs when the scattered light signal is sufficiently large, causing it to be the dominant signal present on the detector, making detection of the desired signal impossible. The second phenomenon occurs when the detector's sensitivity is very great, and, if the electronic mode of detection is of certain types (e.g. detectors that employ avalanche photo-detection), this stray light, when it illuminates the detector, has the potential to irreversibly damage the detector, rendering it permanently useless.

For various reasons, which are due, in part, to the limitations of optical fabrication technology, there exists a certain amount of scattered light reflections from all of the optical services present in the optical pathway of the transmitting laser source. These surfaces may be mirrors, lenses, filters, etc. Therefore, it is an inherent problem of all laser detection systems that stray light from the laser source may damage an optical detector, or may render the device entirely, or partially useless.

While light traps and isolators exist, no such devices exist that provide sufficient protection of today's sensitive receivers from the laser transmitters used in modern relatively high-power applications.

What is needed, therefore, is a device that can trap and isolate large amounts of laser power so that it cannot eventually travel to a detector in an optical receiver.

SUMMARY

One object of the present disclosure is to provide a device that can trap and isolate large amounts of laser power so that it cannot eventually travel to a detector in an optical receiver, wherein such a device would also be useful anywhere a large amount of power, in the form of light, needs to be absorbed or occluded.

One embodiment of the present disclosure provides a high fidelity optical beam dump, the beam dump comprising: at least two glass plates wherein each plate comprises a first side and a second side, wherein the second side opposes the first side of the plate, wherein the plates are configured to define an optical path configured to reflect a beam incident the optical path from plate to plate, with the first sides of the plates being positioned to receive the beam, and wherein the first sides are coated with an anti-reflective coating and the second sides are coated with a high-reflective coating.

Another embodiment of the present disclosure provides such a beam dump wherein the first and second plates are made of a specular absorbing glass and further comprising a third plate made of diffuse ground absorbing glass substantially perpendicular to the optical path defined by the first and second plates.

A further embodiment of the present disclosure provides such a beam dump wherein the beam is reflected between the first and second plates along a first direction and the third plate is configured to reflect the beam in a reverse direction from the first direction.

One embodiment of the present disclosure provides a high fidelity optical beam dump, the beam dump comprising: a housing comprising an aperture therein; and at least one pair of optically absorptive panels lining opposing sides of an interior of the housing, wherein the absorptive panels are configured to absorb and reflect between each other a beam incident the aperture, thereby trapping and attenuating the beam.

Another embodiment of the present disclosure provides such a beam dump wherein the absorptive panels are made of glass.

A further embodiment of the present disclosure provides such a beam dump wherein the glass is specular absorbing glass.

Yet another embodiment of the present disclosure provides such a beam dump wherein the absorptive panels are coated with an anti-reflective coating on a portion thereof facing the interior of the housing.

A yet further embodiment of the present disclosure provides such a beam dump wherein the absorptive panels are coated with a high-reflective coating on a portion thereof facing an exterior of the housing.

Still another embodiment of the present disclosure provides such a beam dump wherein opposing optically absorptive panels lining the interior of the housing are parallel to one another.

A still further embodiment of the present disclosure provides such a beam dump wherein the aperture is tilted at a 45-degree angle with respect to at least one pair of parallel absorbing plates.

Even another embodiment of the present disclosure provides such a beam dump further comprising a reflective injection optic configured to reflect light incident thereon through the aperture in the housing of the beam dump.

An even further embodiment of the present disclosure provides such a beam dump wherein the reflective injection optic is an off-axis paraboloid.

A still even another embodiment of the present disclosure provides such a beam dump further comprising a refractive injection optic configured to refract a beam incident thereon through the aperture in the housing of the beam dump.

A still even further embodiment of the present disclosure provides such a beam dump wherein the refractive injection optic comprises a flat mirror and lens, wherein the flat mirror is configured to refract a beam incident thereon through the lens, which is configured to focus the beam through the aperture in the housing.

One embodiment of the present disclosure provides a high fidelity optical beam dump, the beam dump comprising: a housing comprising an aperture therein; a beam injection optic configured to redirect a beam incident thereon through the aperture and into an interior of the housing; and at least one pair of substantially parallel, optically-absorptive glass panels forming an optical path therebetween lining opposing sides of the interior of the housing, the absorptive panels being in optical communication with the aperture and comprising an anti-reflective coating on a portion facing the interior of the housing and further comprising a high-reflective coating on an opposing face thereof, wherein the absorptive panels are configured to absorb and reflect between each other a beam incident the aperture, thereby trapping and attenuating the beam and wherein the aperture is tilted at a 45-degree angle with respect to at least one pair of parallel absorbing plates.

Another embodiment of the present disclosure provides such a beam dump wherein the beam injection optic is a reflective injection optic.

A further embodiment of the present disclosure provides such a beam dump wherein the beam injection optic is an off-axis paraboloid.

Yet another embodiment of the present disclosure provides such a beam dump wherein the beam injection optic is a refractive injection optic.

A yet further embodiment of the present disclosure provides such a beam dump wherein the glass plates are oriented to be substantially parallel, converging or diverging with respect to each other.

Still another embodiment of the present disclosure provides such a beam dump wherein all interior surfaces of the housing, with the exception of the optical path defined by the aperture therein, are parallel and comprise optically-absorptive glass panels comprising an anti-reflective coating on a portion facing the interior of the housing and further comprising a high-reflective coating on an opposing face thereof.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIGS. 12A-12B are simulated ray-traced performance illustrations of embodiments of high-fidelity optical beam dumps using different beam injection optics, wherein FIG. 12A shows a reflective injection embodiment using an off-axis paraboloid and FIG. 12B shows a refractive injection embodiment using a conventional refractive lens, in this case a flat mirror and lens combination, in accordance with embodiments of the present disclosure.

DETAILED DESCRIPTION

In its essence, an optical beam dump or trap is a device that absorbs light and prohibits it from exiting. Major design concerns in a beam dump typically include the management and reduction of back reflections and scattering as well as the dissipation of heat generated by absorption. For low-power systems and less demanding applications, the device can be as simple as a piece of black velvet or flock paper glued onto a stiff backing, but higher-power beam dumps must often incorporate more elaborate features to avoid back-reflection, overheating, and/or excessive noise.

Several optical vendors manufacture and sell optical beam dumps. For example, the company ThorLabs Incorporated sells a device that they call a model BT600 Beam Trap. This device is specified by its manufacturer to have a "backscatter" value of $2 \times 10^{-4}$. This value represents the total integrated backscatter as a fraction of entrance beam power. In situations where the laser power that is required to be trapped is large, or in situations in which the damage threshold of the associated detector is very small, a significantly larger degree of isolation may be required.

Devices created in accordance with the teachings of the present disclosure have an effective backscatter index of greater than $10^{-9}$ to $10^{-13}$, or, in embodiments, even better, depending on design choices. Such a backscatter index range is 1 million to 1 billion times better than what is achievable using the current state of the art. Furthermore, there is practically no limit to the isolation that devices created in accordance with the teachings of the present disclosure can provide. Greater degrees of isolation can be achieved by variations in design choices, as described herein.

The particular efficiency of embodiments of the present disclosure is demonstrated by analysis and calculations to be greater than 1 part in $10^{12}$. That is, for every watt of power entering the device, the amount of light that is capable of exiting is $10^{-12}$ Watts. This efficiency factor can be engineered (increased or decreased) by changing certain design parameters of its construction, such as the absorbing glass type, its thickness, and the overall length, or size of the device.

Figure 1:
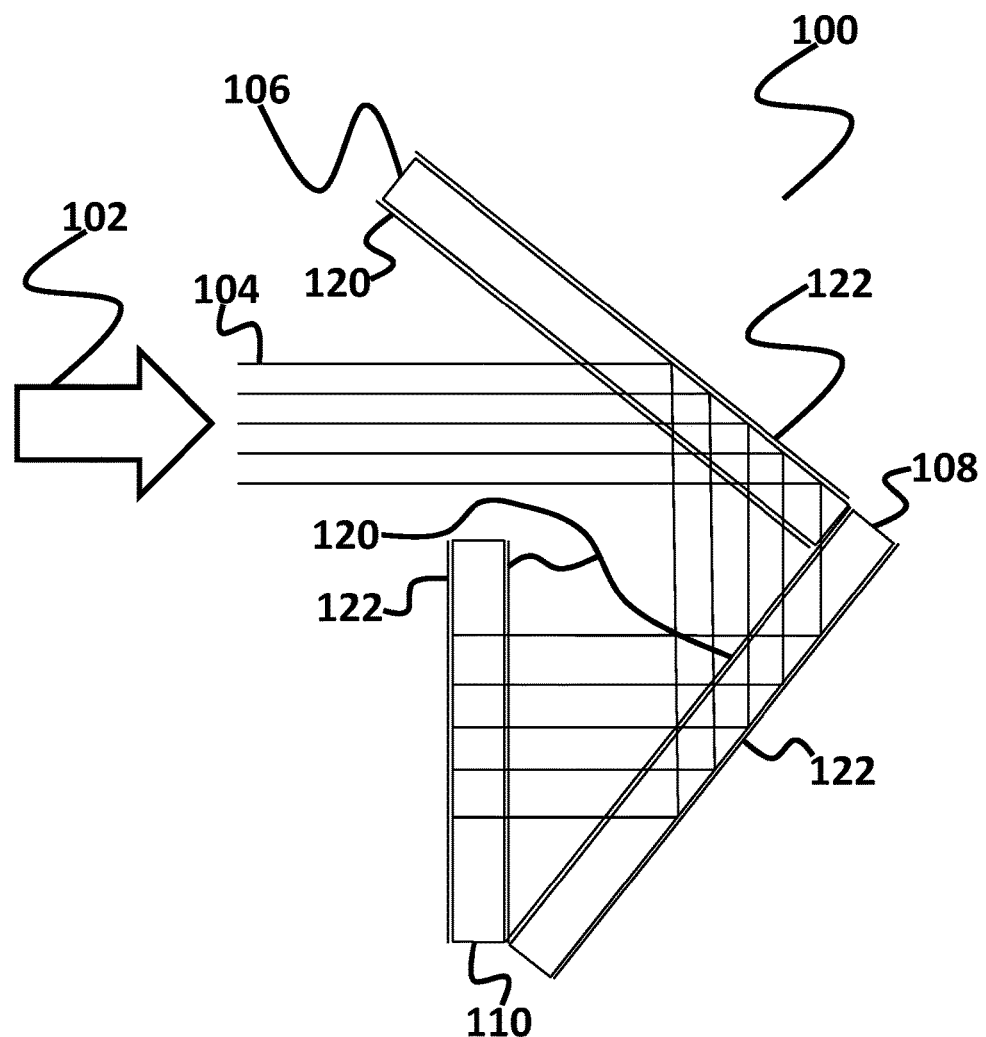
FIG. 1 is a right-side elevation view of a high-fidelity beam trap, configured in accordance with one embodiment of the present disclosure.

FIG. 1 shows a right-side elevation view of a simplified embodiment of a high-fidelity beam trap 100, configured in accordance with one embodiment of the present disclosure. The beam trap works by presenting successive absorbing surfaces 106/108/110 to an optical beam 104, where each surface 106/108/110 is tilted with respect to the optical beam 104. In embodiments, the surface facing the optical beam 104 is coated with an anti-reflection (AR) coating 120, while the surface away from the optical beam is coated with a highly reflective (HR) coating 122. The AR coatings 120 can be applied to portions of the interior surfaces or the entire interior surfaces. Likewise, the HR coatings can be applied to portions of the exterior surfaces of the entire exterior surfaces. This construction, combined with the relative geometry of each successive plate 106/108/110 causes the optical beam 104 to be increasingly absorbed as each absorbing plate 106/108/110 is encountered. By constructing enclosed geometry with a number of plates 106/108/110, the optical beam 104 can be absorbed nearly totally, resulting in virtually none of the light returning through the original entrance aperture. In this embodiment there are three plates, however in other embodiments fewer or additional plates are used.

In embodiments, plates 106 and 108 are constructed of specular absorbing glass with a first surface (interior facing) being coated with an anti-reflective coating 120 and a second surface (exterior facing) coated in a high-reflective coating 122 while plate 110 is made of diffuse ground absorbing glass. In embodiments, any conventional, absorbing laser goggle material (eg. KG5) can be used as the absorbing glass. Additional folds (in and out-of-plane), or added path-length, can be utilized to add greater levels of attenuation as needed.

The following equation may be used to compute the attenuation power of such an optical beam trap:

$$\rho = \frac{D^2}{4*(N+1)^2} * R^{2N} * R_0 * (1-R)^{4N} * e^{-4N\alpha t}$$

Figure 2:
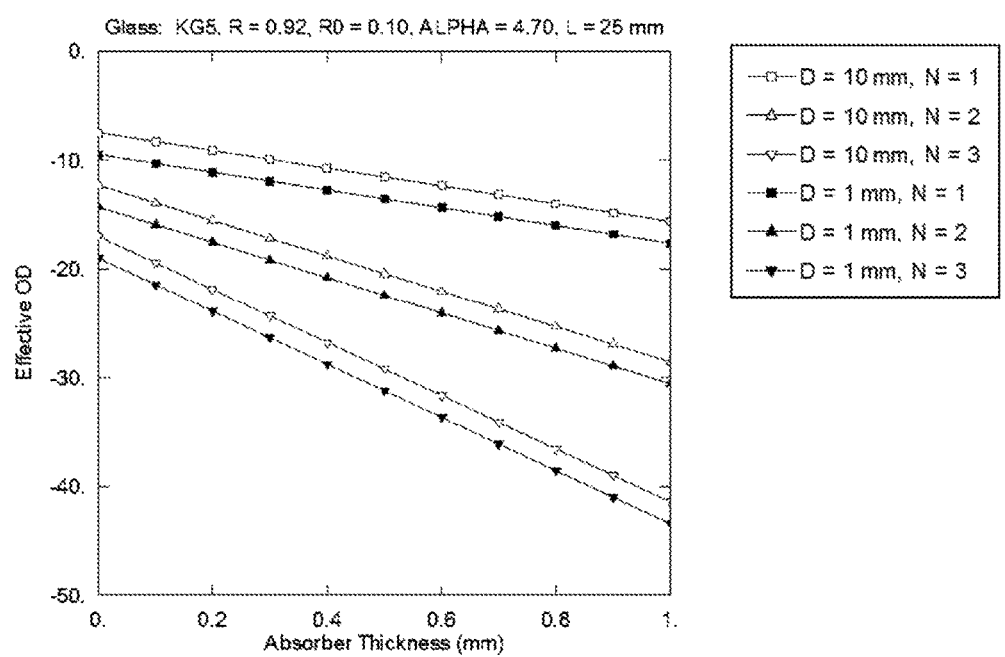
FIG. 2 is a graph showing the computed performance of the stage beam trap of embodiments of the present disclosure using 1, 2, and 3 stages and entrance pupil diameters of 1 and 10 mm, in accordance with embodiments of the present disclosure.

Where:
N=Number of absorptive stages
D=Diameter of beam trap entrance aperture
R=Reflectance (single surface) of absorptive plate
$R_0$=Reflectance (single surface) of last plate
t=Thickness of absorptive plate (along propagation direction)
α=Absorption coefficient of laser wavelength in absorber bulk material L=Separation between absorptive stages FIG. 2 summarizes a calculation using the equation shown and described above that predicts the effective optical density (OD) of embodiments of the present disclosure for various design parameters, wherein the optical density is a term used to define the transmission of an optical filter, where OD=$\log_{10}$ T, where T is the transmission of the optical filter. In FIG. 2, the stage count (N) is equal to 1, 2, or 3 and the entrance pupil diameter is either 1.0 mm or 10 mm. The glass used was KG5, R=0.92, R0=0.10, Alpha=4.70, and L=25 mm.

Figure 3:
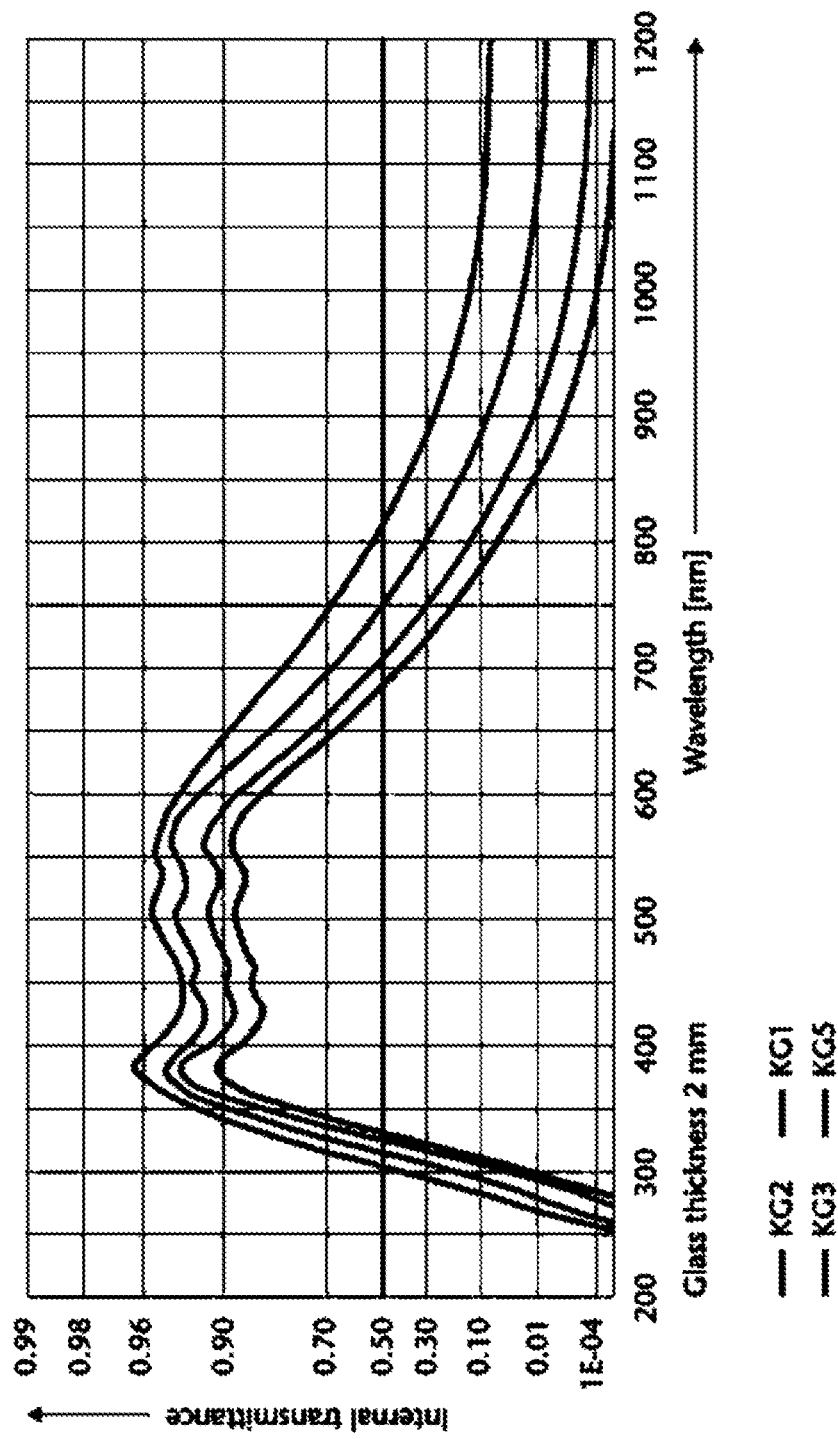
FIG. 3 is a graph comparing internal transmittance to wavelength using various types of 2 mm thick glass, wherein KG2 is represented by the highest line in the graph, KG1 is represented by the second highest line in the graph, KG3 is represented by the third highest line in the graph, and KG5 is represented by the lowest line in the graph.
Figure 4:
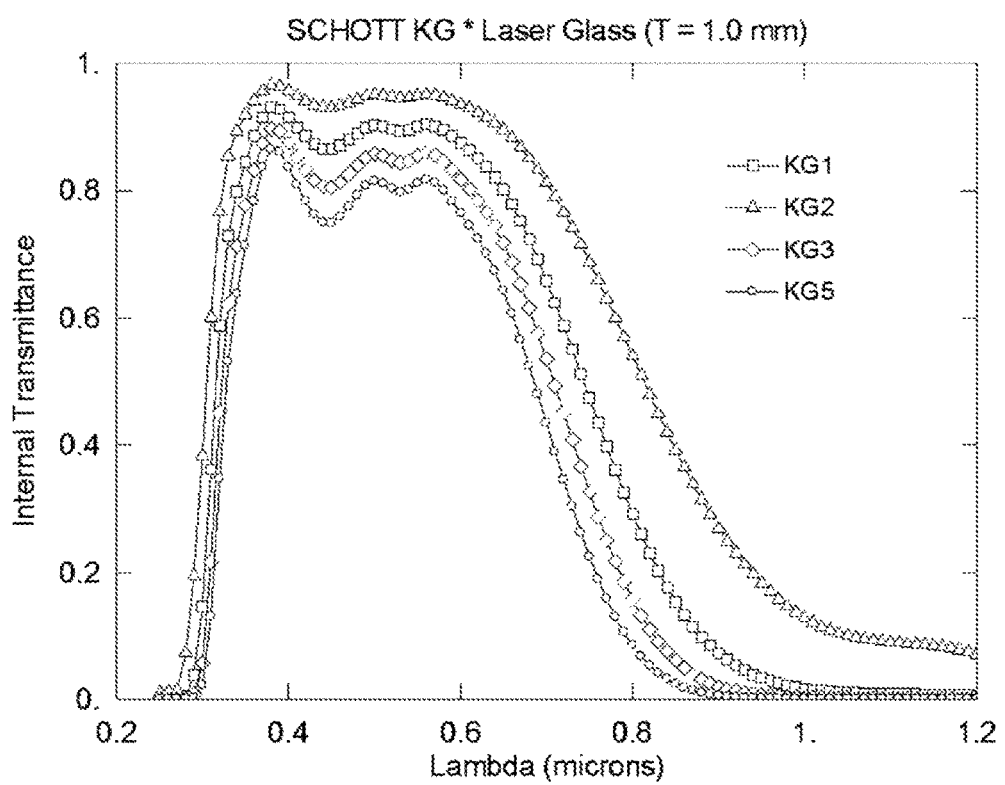
FIG. 4 is a graph comparing internal transmittance to lambda for various types of 1 mm thick glass.

FIGS. 3 & 4 summarize the characteristics of a conventional optical filter glass manufactured by Schott Technologies of Duryea, Pa. The filter glasses named KG2, KG1, KG3, and KG5 are selected for embodiments of the present disclosure because these glass materials absorb well in the mid-IR wavelengths, although those of ordinary skill in the art would recognize that any number of filter glasses having similar characteristics would be suitable for use in constructing embodiments of the present disclosure described herein. Other embodiments, which are designed to absorb other wavelengths, may utilize a different selection of absorbing filter glass.

Figure 5:
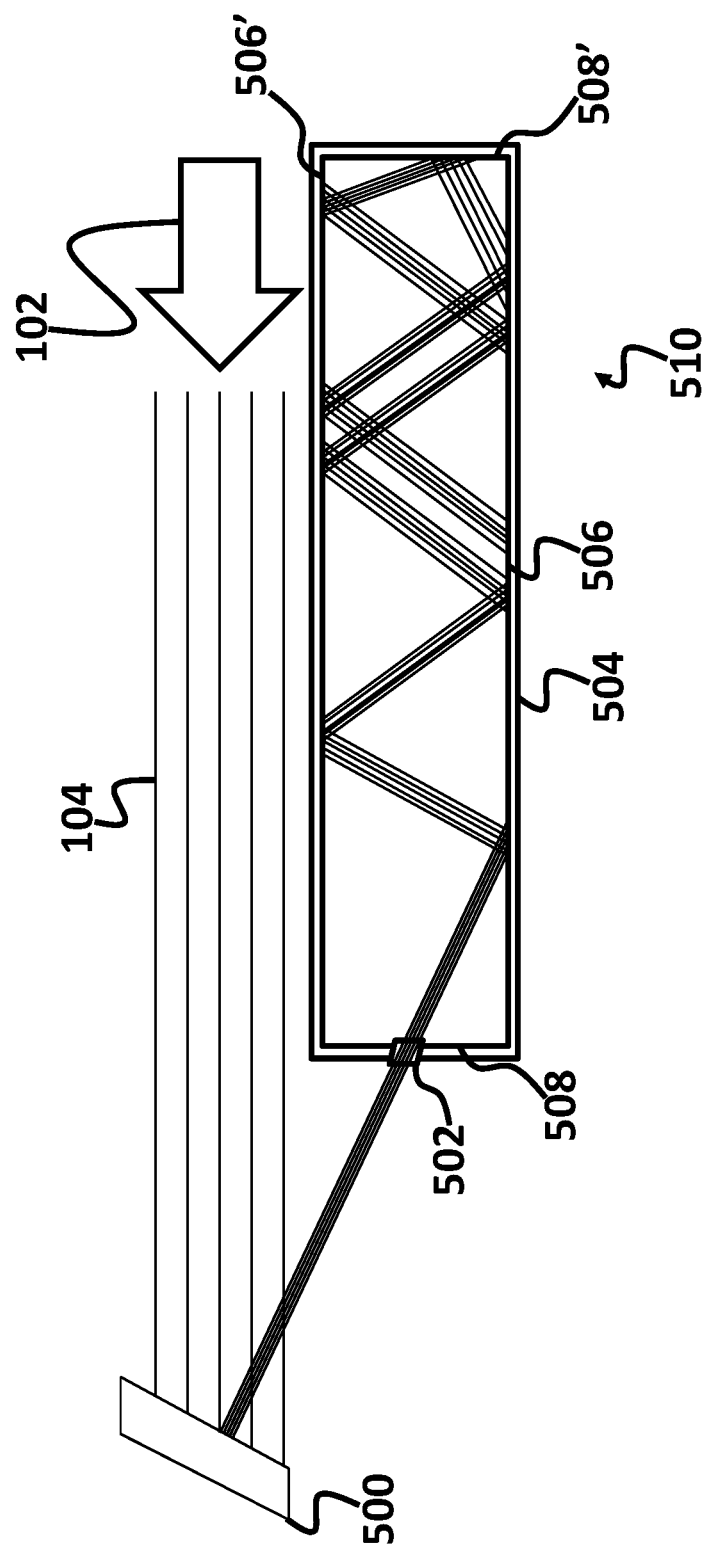
FIG. 5 is a right-side elevation view of an optical beam dump that uses a reflective injection optic to direct a beam to be dumped to the beam dump, configured in accordance with embodiments of the present disclosure.

FIG. 5 depicts the optical and mechanical layout of embodiments of the present beam trap 510. In this configuration, the role of multiple absorbing plates 106/108/110, such as those that are depicted in FIG. 1, is represented in FIG. 5 as two longitudinally-oriented plates 506, 506' and two vertically-oriented plates 508, 508'. In embodiments, plates 506, 506' and/or 508/508' are oriented parallel to each other and the laser beam 104 is directed into them through a small aperture 502 that, in embodiments, is tilted at a 45-degree angle with respect to parallel absorbing plates 506, 506'. This causes an optical beam 104 transmitted therethrough to reflect between the plates 506, 506', 508, 508' repeatedly, until it is gradually and completely absorbed. The length of the plates 506, 506', 508, and 508' is determined by the design of the structure, the radiated and the desired absorption. In another embodiment, the plates are not parallel but are angled as either converging or diverging Additionally, in embodiments, the other side walls are used to absorb radiated energy, wherein all sides (6 in total) of the surrounding space are made of the same absorbing glass and the beam is interjected into the device through the small, tilted aperture 502. In embodiments, the inside surfaces (those surfaces facing towards the interior of the optical beam trap) of the absorbing glass plates 506, 506', 508, 508' are coated in an anti-reflective coating while the outside surfaces (those facing the outer housing 504 of the optical beam trap) are coated in a high-reflective coating. In embodiments, the thickness and type of anti-reflective and/or high-reflective coatings may be varied along the length and/or width of the plates.

A benefit of this tilted aperture 502 configuration is that the effective area of this aperture 502 (as perceived from any external view) quickly vanishes to zero so that no vantage point can see into the volume contained by the beam trap 510 except along the line of sight parallel to the incoming beam 104. The consequence of this is that virtually no light can escape the trap 510 except in the direction backwards, toward the incoming beam 104.

The rays 104 drawn in FIG. 5 depict the light 104 propagating into the beam trap 510 from an external laser source 102. FIG. 5 shows how the rays 104 enter the trap 510 and reflect back and forth between the absorbing plates 506, 506' and 508'. In embodiments, the plates 506, 506', 508 and 508' are 0.5 mm thick and the overall length of the beam trap 510 is 40 mm.

Figure 6:
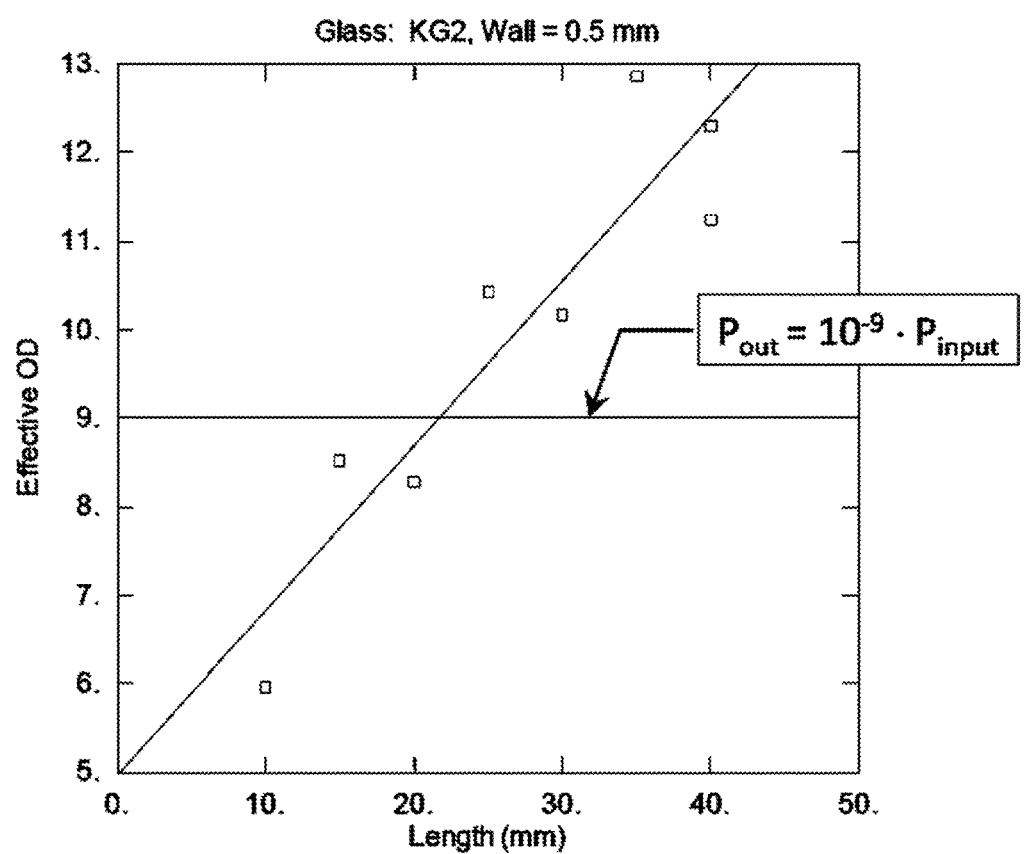
FIG. 6 is a graph showing the effective optical density of a beam to be dumped compared to the length of the optical beam dump and showing the relative output power of the beam after exiting the beam dump as a function of the power input into the beam dump, in accordance with embodiments of the present disclosure.

FIG. 6 summarizes the results of a Monte-Carlo ray trace analysis performed in Zemax® (a conventional optical design and analysis software tool) to predict the overall effectiveness of embodiments of the present disclosure at trapping light 104 from an incoming laser source 102. A Monte-Carlo analysis is a heuristic-based analysis used to simulate the behavior of systems, in this case the behavior of light, including reflections and refractions of individual rays in a beam of light, in an optical system. In this example, the overall length of the beam trap was varied from 10 mm up to 40 mm. Other analyses could vary the thickness of the absorbing filter glass, or the absorbing glass material choice, or the diameter and tilt of the input aperture 502.

Figure 7:
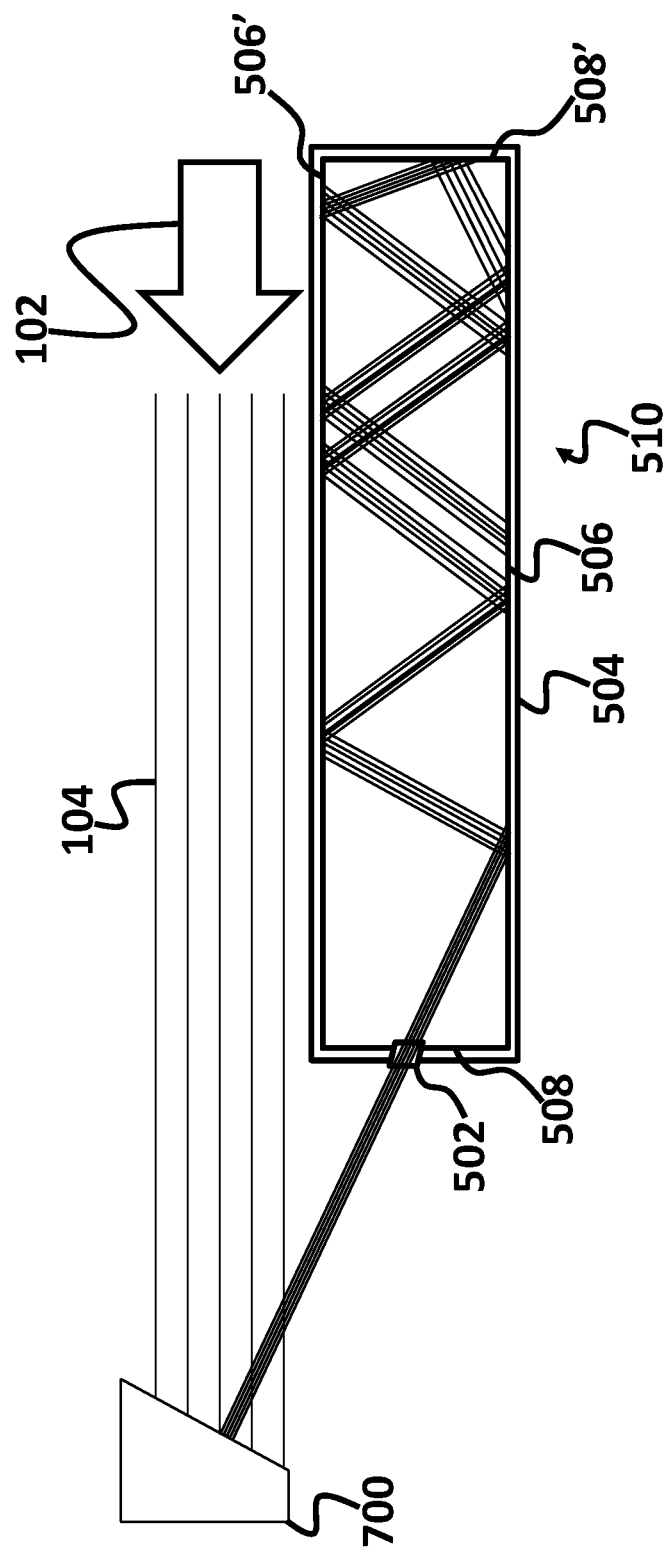
FIG. 7 is a right-side elevation view of an optical beam dump using an off-axis parabolic (OAP) mirror as a reflective injection optic to direct a beam to be dumped to the beam dump, configured in accordance with embodiments of the present disclosure.

FIG. 7 shows a first method by which the laser light 104 is directed into embodiments of the present disclosure. This method utilizes a single reflective optic 700 that reflects the beam 104 and focuses the beam 104 through the aperture 502 at the same time. This optic is, in embodiments, an off-axis paraboloid 700.

Figure 8:
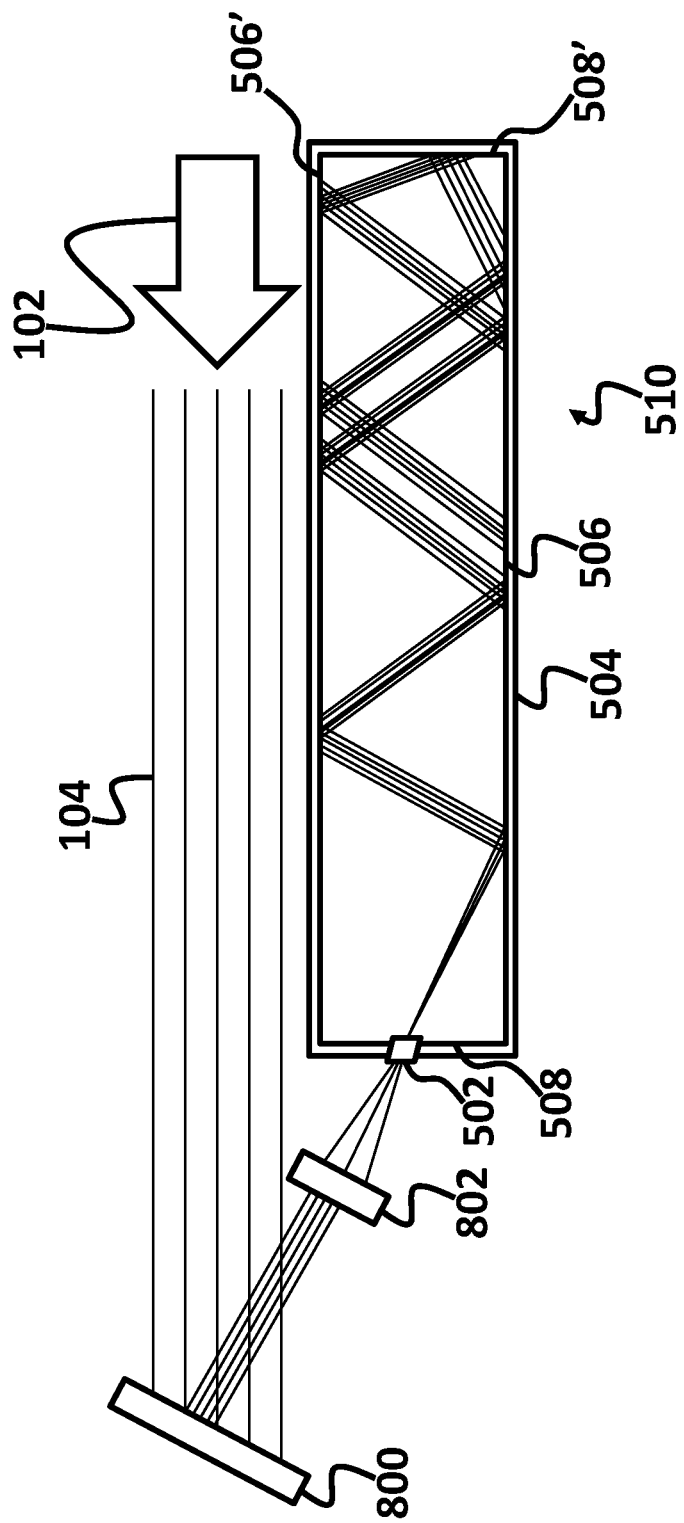
FIG. 8 is a right-side elevation view of an optical beam dump using a flat mirror as a reflective injection optic to direct the beam to be dumped to the beam dump, configured in accordance with embodiments of the present disclosure.

FIG. 8 shows a second method by which the laser light 104 is directed into embodiments of the present disclosure. This method utilizes a flat mirror 800 to direct the beam 104 toward the aperture 502 and a second optic 802, in one example it is a transmissive focusing lens, to focus the beam 104 through the aperture 502.

Regarding the method shown in FIG. 7, this method has the advantage of utilizing fewer optical surfaces.

Regarding the method shown in FIG. 8, the lens utilized in reflecting light, in embodiments, has surfaces that are coated with an anti-reflection coating. Since these surfaces can never perfectly prevent reflections, this causes the occurrence of multiple reflections between the lens surfaces, which can account for as much as 1% of the incoming light. This uncontrolled, and un-captured, laser light (being 1% of the input laser power) can travel anywhere, thereby avoiding the beam trap 510, and thus completely nullify the value of the high-fidelity beam dump 510 since this leakage can be many orders of magnitude more than is acceptable, considering the design goals and the effectiveness of the beam trap 510 of embodiments of the present disclosure.

Figure 9:
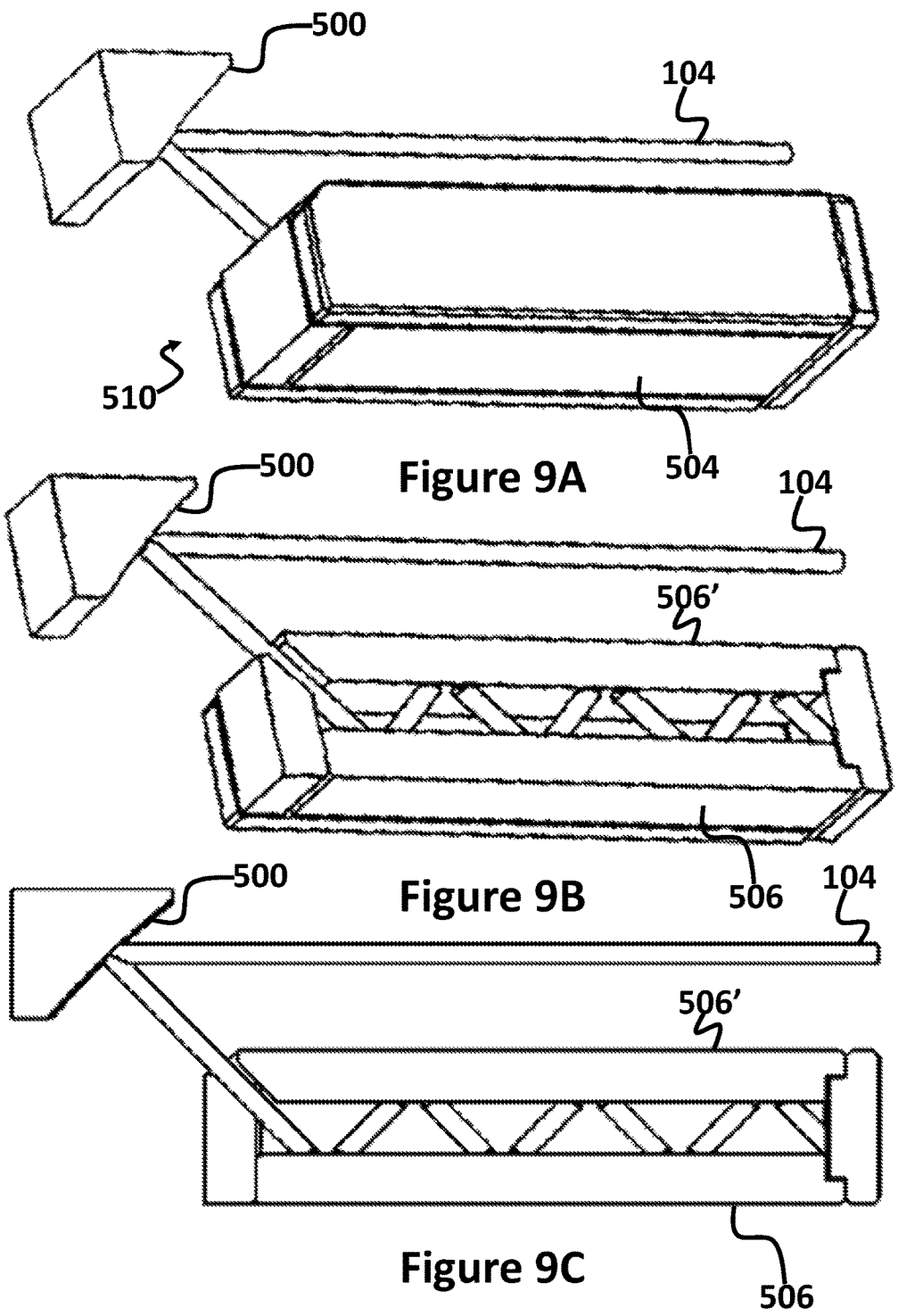
FIG. 9A is a bottom, right perspective view of an optical beam dump configured in accordance with embodiments of the present disclosure.
FIG. 9B is a bottom, right perspective view of an optical beam dump with the outer housing thereof removed, configured in accordance with embodiments of the present disclosure.
FIG. 9C is a right-side elevation view of an optical beam dump with the outer housing thereof removed, configured in accordance with embodiments of the present disclosure.

FIGS. 9A, 9B, and 9C depict a mechanical design of embodiments of the present beam trap 510, showing the design from various angles and with various layers removed for clarity. These figures show the beam 104 reflecting off of a reflective optic 500, entering the beam trap 510, and reflecting off of the inner walls of the beam trap 510, specifically the absorptive panels 506, 506' thereof, which are usually covered by the outer housing 504 of embodiments during use, but which are specifically shown in FIGS. 9B and 9C, in which the outer housing 504 is not shown.

Figure 10:
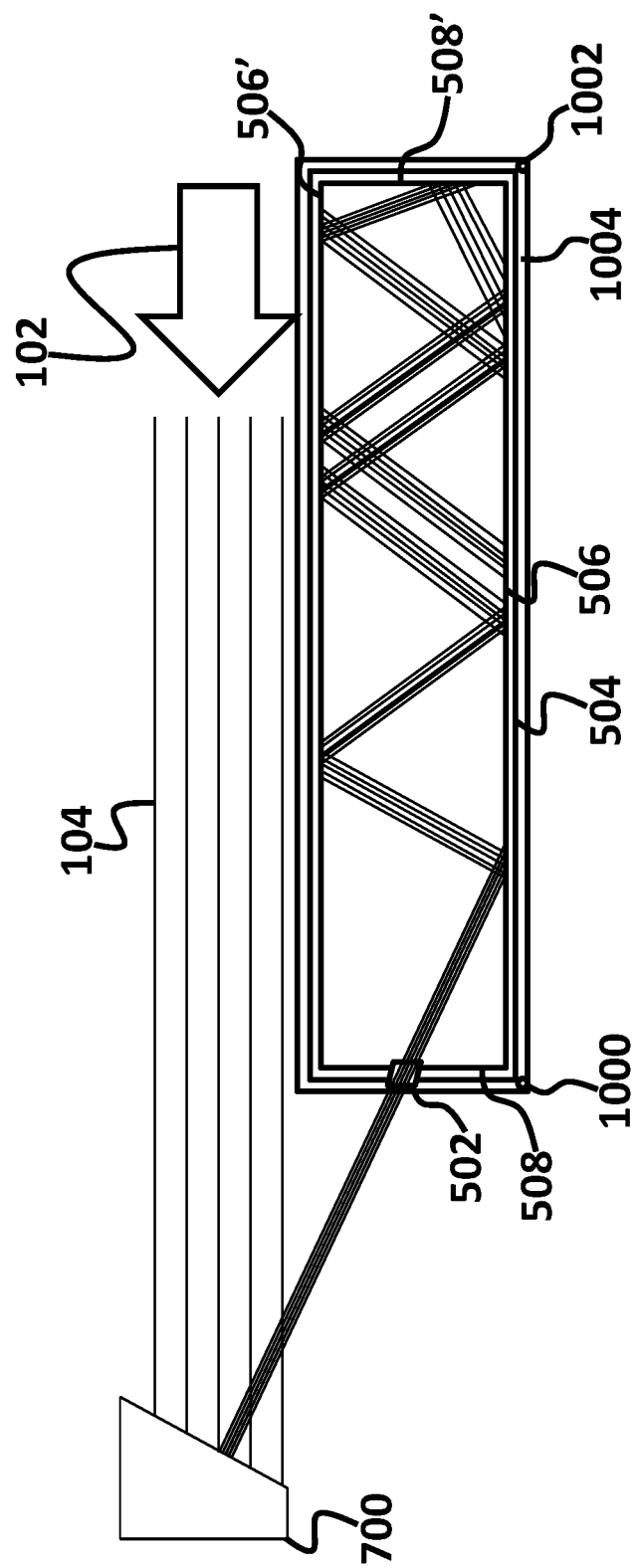
FIG. 10 is a right-side elevation view of an optical beam dump having water cooling, configured in accordance with embodiments of the present disclosure.
Figures 11A, 11B, 11C, 11D:
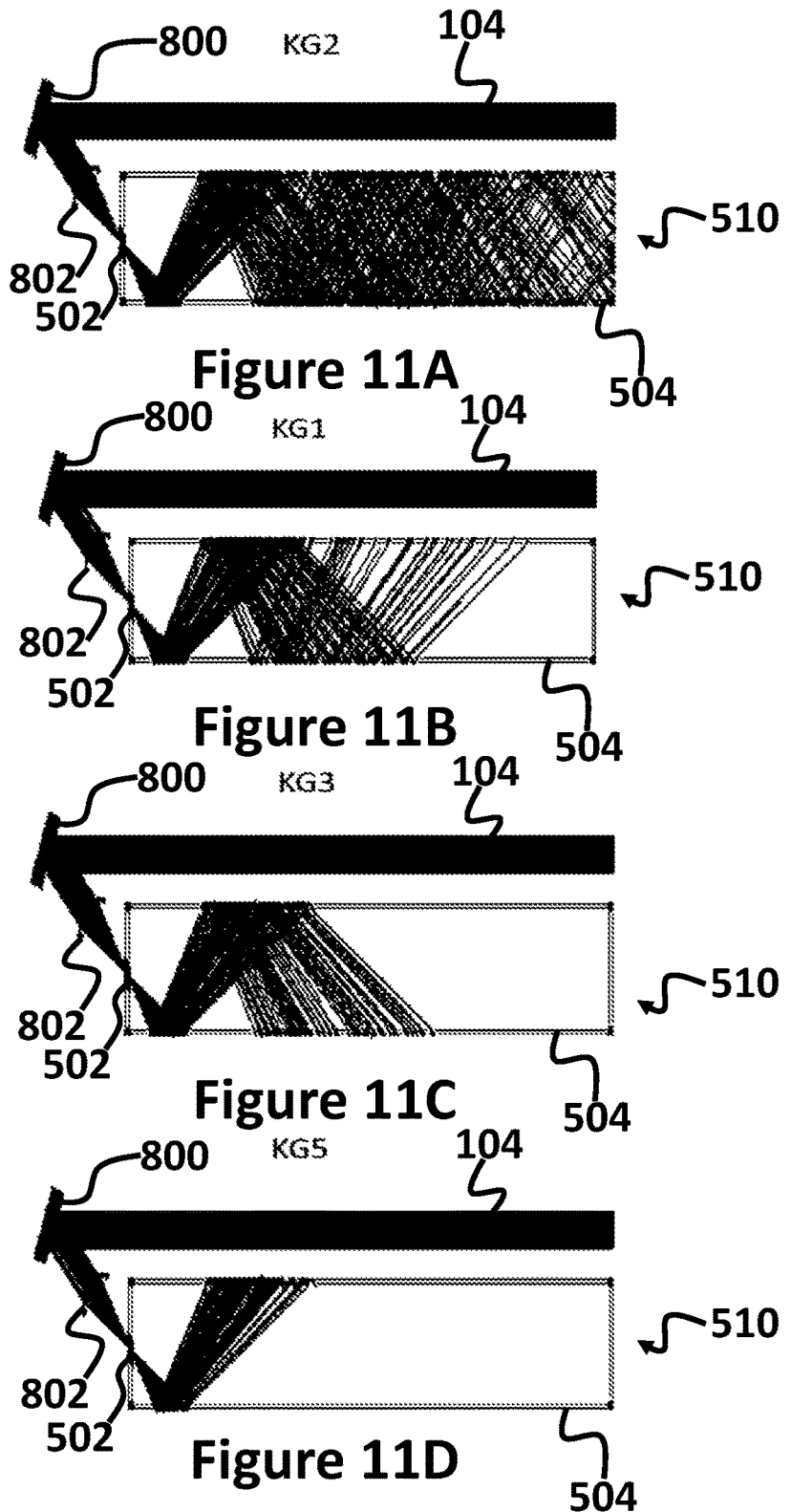
FIGS. 11A-11D are simulated ray-traced performance illustrations of embodiments of high-fidelity optical beam dumps using different optical filter glass types, where FIG. 11A uses KG2 glass, FIG. 11B uses KG1 glass, FIG. 11C uses KG3 glass and FIG. 11D uses KG5 glass, each configured in accordance with embodiments of the present disclosure.

FIG. 10 depicts an embodiment of the present disclosure that utilizes an active cooling method. In situations where the amount of optical (e.g. laser) power is large or where it is desirable to attenuate the beam 104 very quickly, the absorbing plates 506, 506', 508, and 508' of the optical beam trap 520 may heat prohibitively. This is because the absorbed optical energy is converted, at least in part, which can cause damage to the absorbing plates 506, 506' if allowed to accumulate. In some cases, this damage may take the form of the optical absorbing plates fracturing or breaking.

To mediate this problem, embodiments utilize active cooling, in some cases using a heat exchanger 1004 having at least one coolant inlet port 1000 and one coolant outlet port 1002. In embodiments, the heat exchanger 1004 is mounted to at least the top and bottom of the absorbing plates. In embodiments, the heat exchanger 1004 may fully encapsulate the housing 504 of the optical beam trap 520. This heat exchanger 1004 can, in embodiments, take the form of a metal plate with an internal, liquid flow channel in which a liquid coolant (e.g. water, ethylene glycol, or similar) is flowed, thereby carrying away the residual heat. In other embodiments, a gas or phase-change cooling system such as a vapor chamber may be used. In embodiments a thermo-electric cooler may be used. If lesser cooling is desired, gas or air can be used instead of a liquid. Other known cooling mechanisms such as heat pipes and heat sinks can also be utilized, depending upon the application parameters.

FIGS. 11A-11D show the results of computations of the beam trap operating with different choices of absorbing laser glass. In these examples, the laser glass is chosen as KG2, KG1, KG3, and KG5 for FIGS. 11A, 11B, 11C, and 11D, respectively. The difference in these figures is mainly due to the different absorption coefficient values of these differing glasses. In this analysis, a laser beam 104 wavelength of 1.53 microns was assumed and a refractive injection technique, utilizing a flat mirror 800 and lens 802 to aim the beam 104 through an aperture 502 inserted into the outer housing 504 of the beam trap 510 at an angle of 45 degrees, was used. If the laser wavelength were a different value, another absorbing glass, which would be readily ascertainable by one of ordinary skill in the art having familiarized themselves with the teachings of the present disclosure, may be chosen.

Figure 12A:
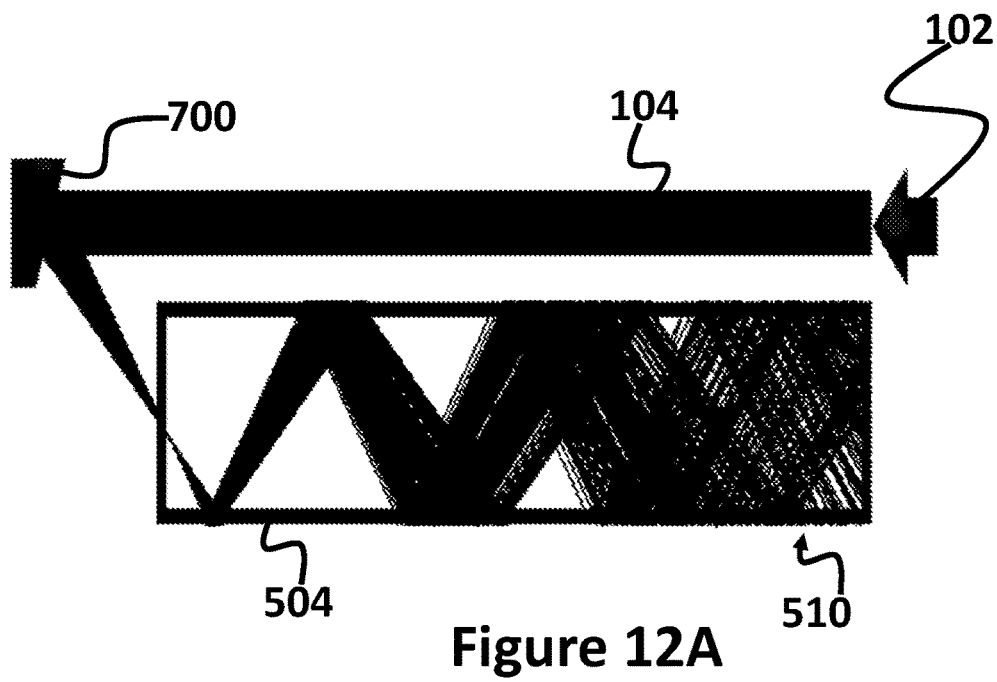
Figure 12B:
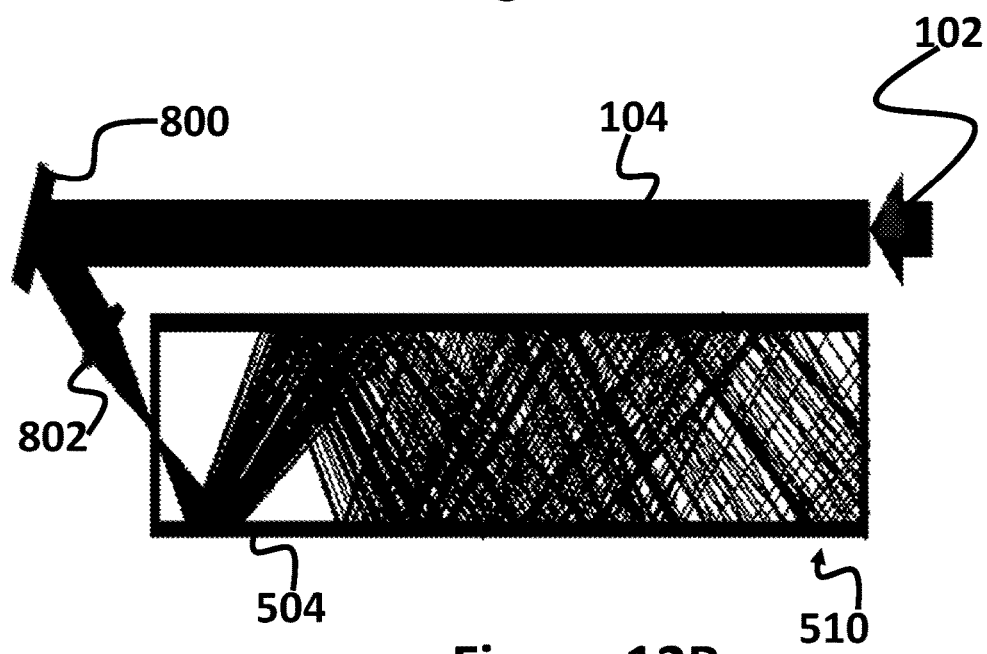

FIGS. 12A and 12B simulate and compare reflective injection and refractive injection techniques. Specifically, FIG. 12A shows an optical beam source 102 generating an optical beam 104 directed at a reflective injection device, an off-axis paraboloid 700. This beam 104 is then redirected by the off-axis paraboloid 700 through an aperture 502 disposed in the optical beam dump housing 504. Once inside the optical beam dump housing 504, the beam 104 is substantially continuously reflected and absorbed until sufficiently attenuated.

Now referring to FIG. 12B, an optical beam source 102 generating an optical beam 104 directed at a refractive injection device, a flat mirror 800, which further directs the beam 104 through a lens 802, is shown. This beam 104 is then redirected by the mirror 800 and lens 802 through an aperture 502 disposed in the optical beam dump housing 504. Once inside the optical beam dump housing 504, the beam 104 is substantially continuously reflected and absorbed until sufficiently attenuated.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A high fidelity optical beam dump, the beam dump comprising:
   at least two glass plates wherein each plate comprises a first side and a second side, wherein said second side opposes said first side of said plate, wherein said plates are configured to define an optical path configured to reflect a beam incident said optical path from said first side of a plate to said first side of a subsequent plate in said optical path, and wherein said first sides are coated with an anti-reflective coating and said second sides are coated with a high-reflective coating.

2. The beam dump of claim 1 wherein a first and second plate disposed in the optical path are made of a specular absorbing glass and further comprising a third plate made of diffuse ground absorbing glass configured to receive light reflected from said second plate, wherein said third plate is oriented substantially perpendicularly to said optical path defined by said first and second plates.

3. The beam dump of claim 2 wherein the beam is reflected between said first and second plates along a first direction and said third plate is configured to reflect the beam along a path substantially identical to that it followed to arrive at said third plate.

4. A high fidelity optical beam dump, the beam dump comprising:
  a housing comprising an aperture therein; and
  at least one pair of optically absorptive panels lining opposing sides of an interior of said housing, wherein said absorptive panels are configured to absorb and reflect between each other a beam incident said aperture, thereby trapping and attenuating said beam,
  wherein said absorptive panels are coated with an anti-reflective coating on a portion thereof facing the interior of said housing, and
  wherein said absorptive panels are coated with a high-reflective coating on a portion thereof facing an exterior of said housing.

5. The beam dump of claim 4 wherein said absorptive panels are made of glass.

6. The beam dump of claim 5 wherein said glass is specular absorbing glass.

7. The beam dump of claim 4 wherein opposing optically absorptive panels lining said interior of said housing are parallel to one another.

8. The beam dump of claim 7 wherein said aperture is tilted at a 45-degree angle with respect to at least one pair of parallel absorbing plates.

9. The beam dump of claim 4 further comprising a reflective injection optic configured to reflect light incident thereon through said aperture in said housing of said beam dump.

10. The beam dump of claim 9 wherein said reflective injection optic is an off-axis paraboloid.

11. The beam dump of claim 4 further comprising a refractive injection optic configured to refract a beam incident thereon through said aperture in said housing of said beam dump.

12. The beam dump of claim 11 wherein said refractive injection optic comprises a flat mirror and lens, wherein said flat mirror is configured to refract a beam incident thereon through said lens, which is configured to focus said beam through said aperture in said housing.

13. A high fidelity optical beam dump, the beam dump comprising:
  a housing comprising an aperture therein;
  a beam injection optic configured to redirect a beam incident thereon through said aperture and into an interior of said housing; and
  at least one pair of substantially parallel, optically-absorptive glass panels forming an optical path therebetween lining opposing sides of said interior of said housing, said absorptive panels being in optical communication with said aperture and comprising an anti-reflective coating on a portion facing said interior of said housing and further comprising a high-reflective coating on an opposing face thereof,
  wherein said absorptive panels are configured to absorb and reflect between each other a beam incident said aperture, thereby trapping and attenuating said beam and wherein said aperture is tilted at a 45-degree angle with respect to at least one pair of parallel absorbing plates.

14. The beam dump of claim 13 wherein said beam injection optic is a reflective injection optic.

15. The beam dump of claim 14 wherein said beam injection optic is an off-axis paraboloid.

16. The beam dump of claim 13 wherein said beam injection optic is a refractive injection optic.

17. The beam dump of claim 13 wherein said glass plates are oriented to be substantially parallel, converging or diverging with respect to each other.

18. The beam dump of claim 13 wherein all interior surfaces of said housing, with the exception of the optical path defined by the aperture therein, are parallel and comprise optically-absorptive glass panels comprising an anti-reflective coating on a portion facing said interior of said housing and further comprising a high-reflective coating on an opposing face thereof.

* * * * *